(12) United States Patent
Cai et al.

(10) Patent No.: US 10,114,682 B2
(45) Date of Patent: *Oct. 30, 2018

(54) METHOD AND SYSTEM FOR OPERATING A DATA CENTER BY REDUCING AN AMOUNT OF DATA TO BE PROCESSED

(71) Applicant: International Business Machines Corporation, Armonk, NY (US)

(72) Inventors: Bin Cai, Beijing (CN); Zhe Xiang, Beijing (CN); Wei Xue, Beijing (CN); Bo Yang, Beijing (CN); Qi Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 15/150,902

(22) Filed: May 10, 2016

(65) Prior Publication Data

US 2016/0253220 A1    Sep. 1, 2016

Related U.S. Application Data

(63) Continuation of application No. 13/643,595, filed as application No. PCT/EP2011/056370 on Apr. 20, 2011, now Pat. No. 9,378,053.

(30) Foreign Application Priority Data

Apr. 30, 2010  (CN) .......................... 2010 1 0171637

(51) Int. Cl.
*G06F 9/46*     (2006.01)
*G06F 9/455*    (2018.01)
(Continued)

(52) U.S. Cl.
CPC .................. *G06F 9/52* (2013.01); *G06F 8/71* (2013.01); *G06F 9/4843* (2013.01);
(Continued)

(58) Field of Classification Search
None
See application file for complete search history.

(56) References Cited

U.S. PATENT DOCUMENTS 7,590,620 B1    9/2009  Pike et al.
7,650,331 B1    1/2010  Dean et al.
(Continued)

FOREIGN PATENT DOCUMENTS

CN    101183368 A       5/2008
WO    2009059377 A1     5/2009

OTHER PUBLICATIONS

International Search Report and Written Opinion; International Application No. PCT/EP2011/056370; International Filing Date: Apr. 20, 2011, dated Aug. 2, 2011, pp. 1-4.
(Continued)

*Primary Examiner* — Bradley A Teets
(74) *Attorney, Agent, or Firm* — Cantor Colburn LLP

(57) ABSTRACT

In response to a map task distributed by a job tracker, a map task tracker executes the map task to generate a map output including version information. The map task tracker stores the generated map outputs. The map task tracker informs the job tracker of related information of the map output. In response to a reduce task distributed by the job tracker, the reduce task tracker acquires the map outputs for key names including given version information from the map task trackers, wherein the acquired map outputs include the map outputs with the given version information and historical map outputs with the version information prior to the given
(Continued)

version information. The reduce task tracker executes the reduce task on the acquired map outputs.

11 Claims, 10 Drawing Sheets

(51) Int. Cl.
| | | |
|---|---|---|
| *G06F 9/52* | (2006.01) | |
| *G06F 9/48* | (2006.01) | |
| *G06F 9/50* | (2006.01) | |
| *G06F 8/71* | (2018.01) | |
| *G06F 17/30* | (2006.01) | |
| *G06F 17/40* | (2006.01) | |

(52) U.S. Cl.
CPC .......... *G06F 9/5005* (2013.01); *G06F 9/5066* (2013.01); *G06F 9/4812* (2013.01); *G06F 17/30* (2013.01); *G06F 17/3023* (2013.01); *G06F 17/30194* (2013.01); *G06F 17/40* (2013.01)

(56) References Cited

U.S. PATENT DOCUMENTS

| | | |
|---|---|---|
| 8,510,538 B1 | 8/2013 | Malewicz et al. |
| 8,682,998 B2 | 3/2014 | Reddy Byreddy et al. |
| 8,832,173 B2 | 9/2014 | Maddhirala et al. |
| 8,943,057 B2 | 1/2015 | Dua |
| 9,378,053 B2* | 6/2016 | Cai .................. G06F 9/4843 |
| 2005/0246323 A1 | 11/2005 | Becher et al. |
| 2006/0058902 A1 | 3/2006 | Yeh et al. |
| 2007/0220026 A1 | 9/2007 | Isard et al. |
| 2008/0046862 A1 | 2/2008 | Sattler et al. |
| 2008/0120314 A1 | 5/2008 | Yang et al. |
| 2008/0189709 A1 | 8/2008 | Amin |
| 2009/0313635 A1 | 12/2009 | Dasdan |
| 2010/0122065 A1 | 5/2010 | Dean et al. |
| 2010/0257198 A1 | 10/2010 | Cohen et al. |

OTHER PUBLICATIONS

Fischer, Michael, Martin Pinzger and Harald Gall, Populating a Release History Database from Version Control and Bug Tracking Systems, pp. 1-11.

Iu et al., "HadoopToSQL, a MapReduce Query Optimizer", Apr. 13-16, 2010, ACM, pp. 251-264.

Yahoo developer Network, "MapReduce", Dec. 27, 2009; Yahoo developer, pp. 1-14.

Arun C. Murthy, "Programming Hadoop Map-Reduce", Yahoo, 2008, pp. 1-42.

Zheng Qi-Long, et al., "Scientific Parallel Computing Based on MapReduce Model," English Abstract, Microelectronics and Computer, vol. 26, No. 8, Aug. 2009, pp. 1-5.

* cited by examiner

METHOD AND SYSTEM FOR OPERATING A DATA CENTER BY REDUCING AN AMOUNT OF DATA TO BE PROCESSED

PRIORITY

This application is a continuation of U.S. patent application Ser. No. 13/643,595 entitled "Generating Map Task Output with Version Information During Map Task Execution and Executing Reduce Tasks using the Output including Version Information," filed on Jan. 7, 2013, which is a National Stage Entry of PCT/EP2011/056370 entitled "Data Center Operation" filed on Apr. 20, 2011, which claims priority to P.R.C. Patent Application No. 201010171637.9 filed on Apr. 30, 2010, the contents of which are incorporated herein by reference in their entirety.

TECHNICAL FIELD

The present invention relates to a mechanism used in a data center, and particularly, to a method and system with version management.

BACKGROUND

MapReduce mechanism is a software framework for distributed computing proposed by Google, which can implement parallel computing on large scale data sets. The concepts and main ideas of "Map" and "Reduce" are originated from functional programming languages. Current MapReduce middleware implementations require an application developer to specify a map function to map a set of key-value pairs to some new key-value pairs (referred to as intermediate key-value pairs), and also require the application developer to specify a reduce function to further process the intermediate key-value pairs outputted from the map function. In the map process, input data are partitioned into M input data splits automatically, and then these input data splits are distributed to multiple machines for parallel processing. In the reduce process, the intermediate key-value pairs are partitioned into R splits (e.g., hash (key) mod R) based on intermediate key names by a partition function, and the R splits are also distributed to multiple machines. The number of partition R and the partition function may be specified by users. The MapReduce mechanism can achieves scalability by distributing operations on the large scale data sets to multiple nodes in a network.

Currently, the MapReduce mechanism is considered as an important program design specification for building a data center, and has a very wide range of applications. The typical applications include: distributed grep, distributed sorting, web access log analysis, reverse index building, document clustering, machine learning, statistics-based machine translation, and so on.

FIG. 1 shows a schematic diagram of an existing MapReduce architecture, wherein a job tracker and multiple task trackers are two most basic services in the MapReduce architecture. Generally, the job tracker is deployed on a master node, receives jobs submitted by users, schedules all the jobs, manages all the task trackers, divides each of the jobs submitted by the users into multiple tasks including map tasks and reduce tasks, and is responsible for distributing the tasks to the corresponding task trackers. A task, as a basic element to be performed, is distributed to an appropriate task tracker for execution. The multiple task trackers poll the job tracker to acquire the tasks. A task tracker executing a map task is a map task tracker, and a task tracker executing a reduce task is a reduce task tracker. The task tracker reports the states of the tasks to the job tracker while executing the tasks, thereby helping the job tracker to know the whole job execution.

Specifically, an input file is uploaded to a distributed file system deployed on the data center, and is partitioned into M input data splits according to a partition rule. The size of each split is generally from 16 to 64 MB. The program files required for job execution are also uploaded to the distributed file system, including job configuration files (including a map function, a combine function, a reduce function, etc.) and the like. When receiving a job request from a client program, the job tracker divides the job into multiple tasks, which include M map tasks and R reduce tasks, and is responsible for distributing the map tasks or reduce tasks to the idle task trackers.

Next, the map task trackers read the corresponding input data splits based on the distributed tasks, and analyze them to obtain input key-value pairs. Then, the map task trackers invoke the map function (e.g. map( )) to map the input key-value pairs into the intermediate key-value pairs, and the intermediate key-value pairs generated by the map function are buffered in a memory. For the buffered key-value pairs, the combine function is invoked to aggregate all key values for each key name and the partition function is invoked to partition the buffered key-value pairs into R splits, then the R splits are written into R regions of local disk periodically. After the map tasks are completed, the map task trackers inform the job tracker of task completion and of position information of the intermediate key-value pairs on its local disk.

When the reduce task trackers receive the reduce tasks from the job tracker, they read the intermediate key-value pairs from the local disk of one or more map task trackers based on the position information, then sort the intermediate key-value pairs based on the key name, and aggregate the key values of the same key name. The reduce task trackers invoke the reduce function (e.g. reduce ( )) to reduce these intermediate key-value pairs, and add the outputs of the reduce function into a final output file.

When the existing MapReduce mechanism is used to process the huge data sets, the involved overhead, e.g., data calculation overhead, data transfer overhead, etc., is usually proportional to the sizes of the input data sets. Therefore, when the sizes of the input data sets increase, the above overheads increase too. In addition, the sizes of input data sets usually increase along with the time, for example, a Call Detail Record (CDR) data set in the telecommunication field and web logs data set in network sites are growing day by day. As a result, the sizes of the accumulated data sets could reach a very large scale soon and continue to increase day by day, which makes the MapReduce jobs over them require more time or resources. In the existing MapReduce mechanism, each time when the data addition occurs in the data sets, the whole data sets will be MapReduced again. However, in many cases, although the accumulated data sets are growing larger and larger, the delta addition generated in a day or a week may be much smaller relatively. That is, the affected data are relatively fewer, and thus it may waste many unnecessary time and resources to re-MapReduce the whole data sets, and as the data sets increase, the time and resources required for processing increase too.

SUMMARY

The present invention is proposed in view of the above technical problem, and its objective is to provide a method and system for operating a data center, which can effectively reduce the amount of data to be processed each time when data addition occurs, thereby reducing the processing time.

In one embodiment, a computer program product for an operating data center may be provided. The data center may include a job tracker, map task trackers, and reduce task trackers comprising a non-transitory storage medium readable by a processing circuit and storing instructions for execution by the processing circuit for performing a method. The method may include, in response to a map task distributed by the job tracker, executing, via a map task tracker, the map task to generate a first map output having first version information, wherein the first version information includes a version value identifying when the map task was added and is assigned by the map task tracker. Executing may further include receiving from the job tracker the map task, the map task specifying storage positions for input data splits of the map task; reading the input data splits from the storage positions included in the map tasks; analyzing the input data splits to generate key-value pairs; assigning a version value to each of the key-value pairs; executing, with a map function, a map operation on the key-value pairs having the version value to generate intermediate key-value pairs having the version value; executing a partition operation on the intermediate key-value pairs to generate the first map output; storing, via the map task tracker, the generated first map output; informing, via the map task tracker, the job tracker of the map task completion; and transmitting, via the map task tracker, to the job tracker, related information of the first map output, in order for the job tracker to provide the map output to the reduce tracker, wherein the related information comprises a job number, a map task number, and the first version information. In some embodiments, in response to a reduce task distributed to a reduce task tracker by the job tracker including the related information, the method may include acquiring, via the reduce task tracker, one or more map outputs for key names having specified version information from the map task tracker, wherein the acquired one or more map outputs comprise one or more current map outputs having the first version information and one or more historical map outputs having historical version information, wherein the historical version information indicates origination of the key names from a historical map task added prior to the map task, wherein the specified version information defines a range of the map outputs required for the reduce task including the first version information; and executing, via the reduce task tracker, the reduce task on the acquired one or more map outputs.

In another embodiment, a method for reducing data by a reduce task tracker in a data center may be provided. The method may include, in response to a reduce task distributed by a job tracker, acquiring one or more map outputs for key names having given version information assigned by map task trackers; wherein the acquired one or more map outputs comprise one or more current map outputs with the given version information and one or more historical map outputs with historical version information indicating a time prior to the version information; wherein the given version information was assigned by a map task tracker and indicates when a map task from which the one or more current map outputs originated was added. The method may also include executing the reduce task on the acquired one or more map outputs.

In another embodiment, a reduce task tracker for reducing data in a data center may be provided. The reduce task tracker may include an acquisition module that, in response to a reduce task distributed by a job tracker, which acquires, by a computer processor, one or more map outputs for key names having given version information assigned by map task trackers; wherein the acquired one or more map outputs comprise one or more current map outputs with the given version information and one or more historical map outputs with historical version information indicating a time prior to the given version information; wherein the given version information was assigned by a map task tracker and indicates when a map task from which the one or more current map outputs originated was added. The reduce task tracker may also include a reduce task execution module that executes the reduce task on the acquired one or more map outputs.

BRIEF DESCRIPTION OF THE DRAWINGS

Embodiment(s) of the invention will now be described, by way of example only, with reference to the accompanying drawings in which.

DETAILED DESCRIPTION

It is believed that the above and other objects, features and advantages of the present invention will become more apparent from the following detailed description of the preferred embodiments of the present invention taken in conjunction with the drawings.

Figure 1:
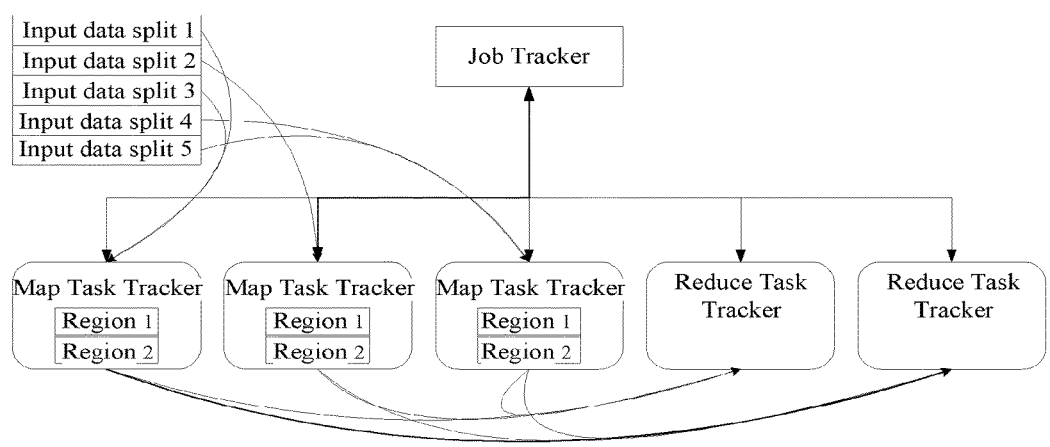
FIG. 1 is a schematic diagram of an existing MapReduce architecture.
Figure 2:
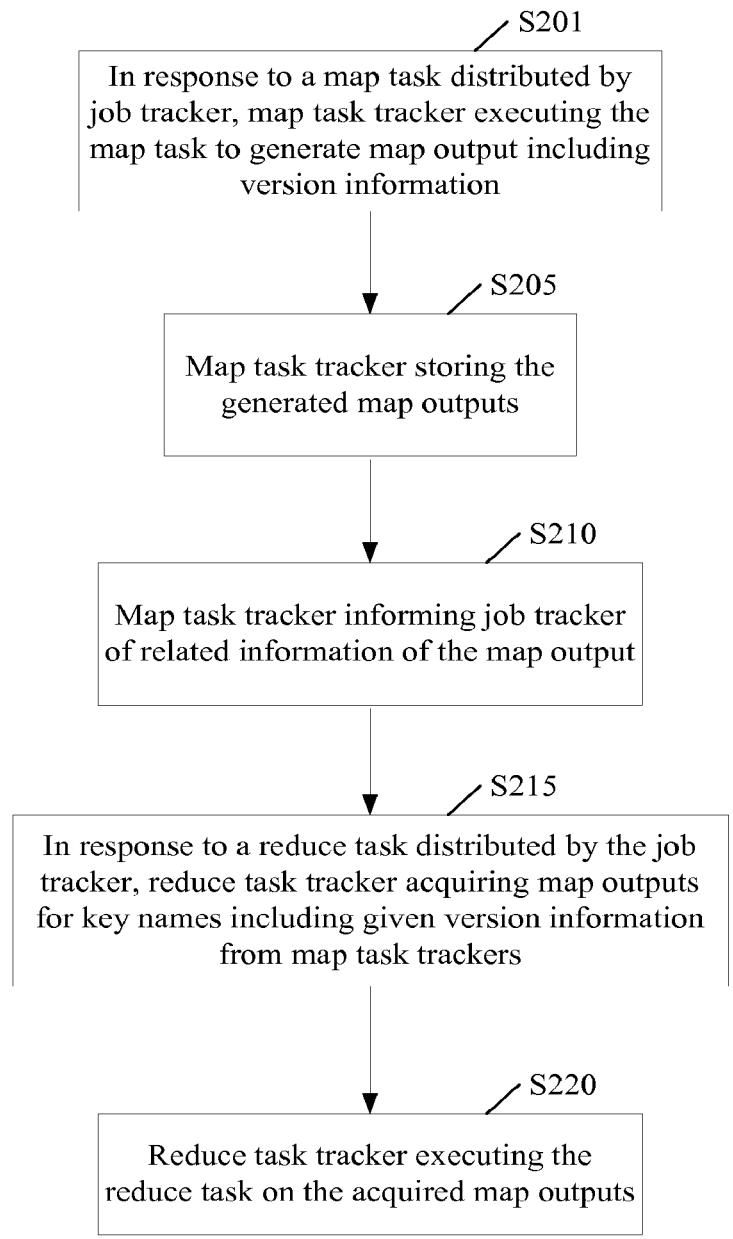
FIG. 2 is a flow chart of a MapReduce method for a data center according to an embodiment of the present invention.

FIG. 2 shows a flow chart of a MapReduce method for a data center according to an embodiment of the present invention. The present embodiment will be described in detail in conjunction with the figure.

In the embodiment, the data center includes a job tracker, map task trackers and reduce task trackers.

As shown in FIG. 2, at step S201, in response to a map task distributed by the job tracker, the map task tracker executes the map task to generate the map outputs including version information. In this step, the job tracker receives a job request from a client program, divides the job into multiple tasks including M map tasks and R reduce tasks, and distributes the map tasks or reduce tasks to the idle task trackers. When receiving the distributed task, the map task tracker starts to execute the map task. In the description of the present embodiment and subsequent embodiments, the case where the version information only includes a version value (i.e. the version information is the version value) will be primarily described.

Figure 3:
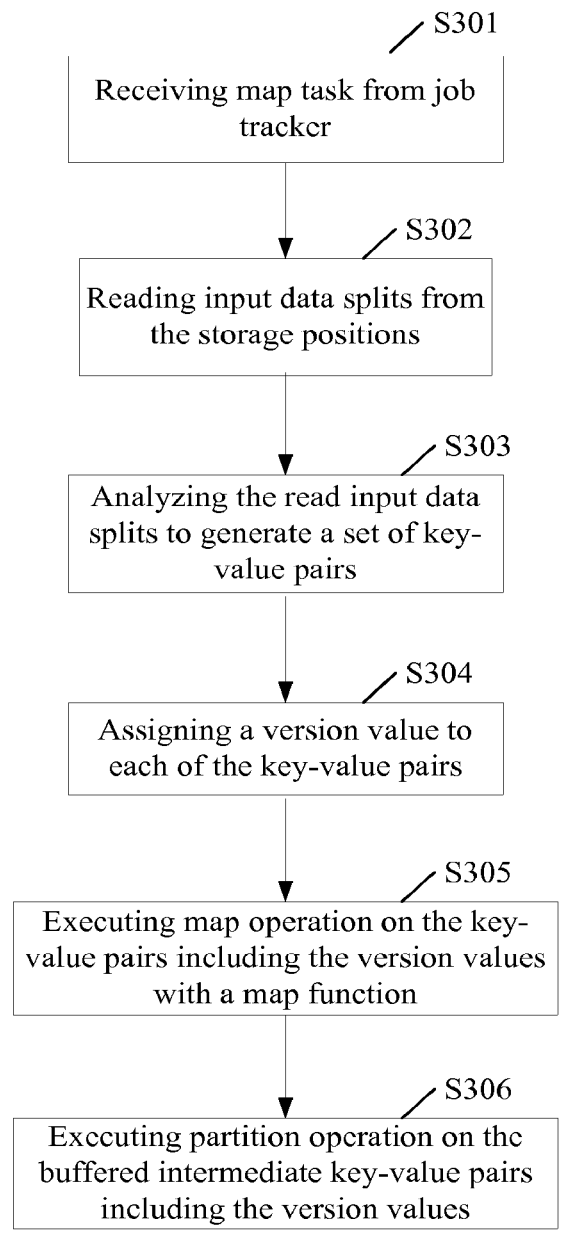
FIG. 3 is a flow chart of an example of the map task tracker executing the map task in the embodiment shown in FIG. 2.

FIG. 3 shows a flow chart of an example of the map task tracker executing the map task. As shown in FIG. 3, at step S301, the map task tracker receives the map task from the job tracker, wherein the map task includes storage positions for input data splits of the map task. Next, at step S302, the input data splits are read from the storage positions. The storage positions may be the map task tracker or other servers. At step S303, the map task tracker analyzes the read input data splits to generate a set of key-value pairs in the form of <key name (Key), key value (Value)>. Then, at step S304, the map task tracker assigns a version value Version to each of the key-value pair. Thus, the form of the key-value pair becomes <Key, Value, Version>. By means of the version value, whether the input data splits are newly added data or not can be identified. Each time when the data addition occurs, a new version value will be assigned. At step S305, the map task tracker employs a map function to execute a map operation on the key-value pairs including the version value. Specifically, the key-value pairs including the version value are delivered to the map function specified by the user, and the map function executes mapping on the key names and key values without changing the version value, thereby forming the intermediate key-value pairs including the version value. The generated intermediate key-value pairs including the version value are buffered in a memory. At step S306, the partition operation is executed on the buffered intermediate key-value pairs. Specifically, the combine function and the partition function are applied to the buffered intermediate key-value pairs to generate the map output of the map task, wherein the key values of the same key name are aggregated together, i.e., the map output is represented as <Key, Value 1, Version, Value2, Version, . . . >.

Figure 4:
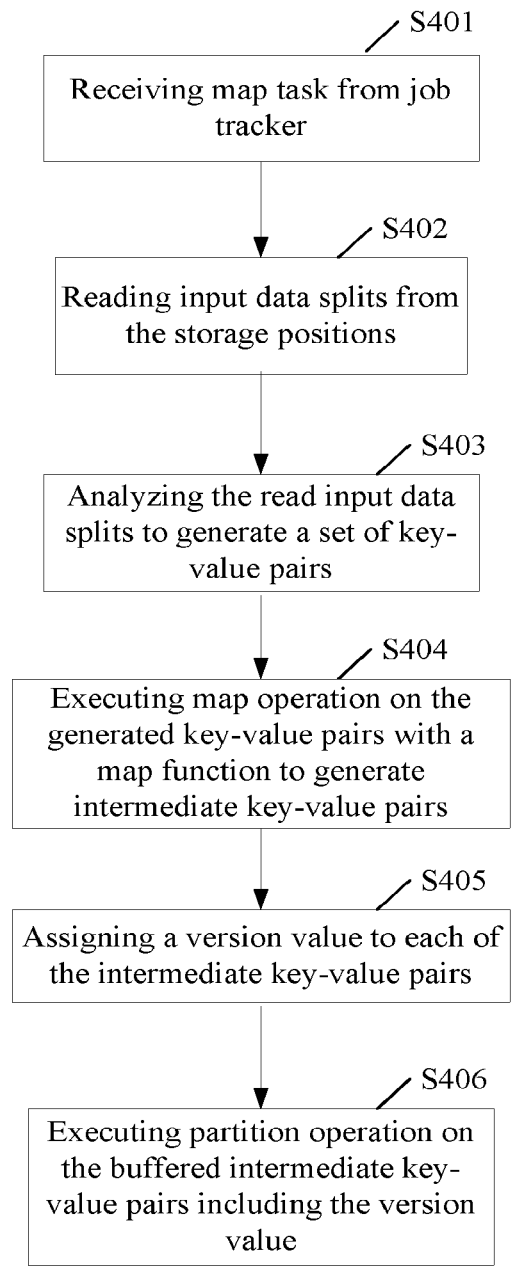
FIG. 4 is a flow chart of another example of the map task tracker executing the map task in the embodiment shown in FIG. 2.

FIG. 4 shows a flow chart of another example of the map task tracker executing the map task, wherein the steps S401, S402, S403 are identical with the steps S301, S302, S303 in the example shown in FIG. 3. In the present example, at step S404, the map function is used to execute the map operation on the generated key-value pairs to generate the intermediate key-value pairs. Then at step S405, the version value is assigned to each of the above intermediate key-value pairs and the intermediate key-value pairs including the version value are buffered in the memory. At step S406, the buffered intermediate key-value pairs including the version value are partitioned to generate the map output of the map task.

Returning to FIG. 2, at step S205, the map task tracker stores the map output generated in step S201. In the present embodiment, the map task tracker stores the map output in the storage region of the local hard disk according to the version value and the associated reduce task tracker (index identifications in the R reduce tasks may be used). In all map task trackers, the map outputs including the same key name are associated with the same reduce task tracker. Of course, those skilled in the art can understand that the map output can be stored in other ways besides based on the version value and the associated reduce task tracker.

Then, at step S210, the map task tracker informs the job tracker of the related information of the map output. In the present embodiment, the related information of the map output may include a job number, a map task number and the version information. Further, the related information may include a set of key names, i.e., the set of the key names involved in the map task. After the distributed map task is completed, the map task tracker informs the job tracker of the task completion, and transmits the related information of the map output to the job tracker, so that the job tracker can provide it to the reduce task tracker. Before transmitting the set of key names to the job tracker, the map task tracker may use Bloom Filter to process these key names to save the storage space. The Bloom Filter is well known to those skilled in the art, and the description thereof will be omitted herein.

At step S215, in response to the reduce task distributed by the job tracker, the reduce task tracker acquires map outputs for key names including a given version value from map task trackers, wherein the acquired map outputs include the map outputs including the given version value and the historical map outputs including the version values prior to the given version value. In the present embodiment, the communication between the reduce task tracker and the map task tracker is based on a pull model. In this step, after the job tracker knows that all map tasks are completed, it informs the reduce task tracker to begin to execute the reduce task.

Figure 5:
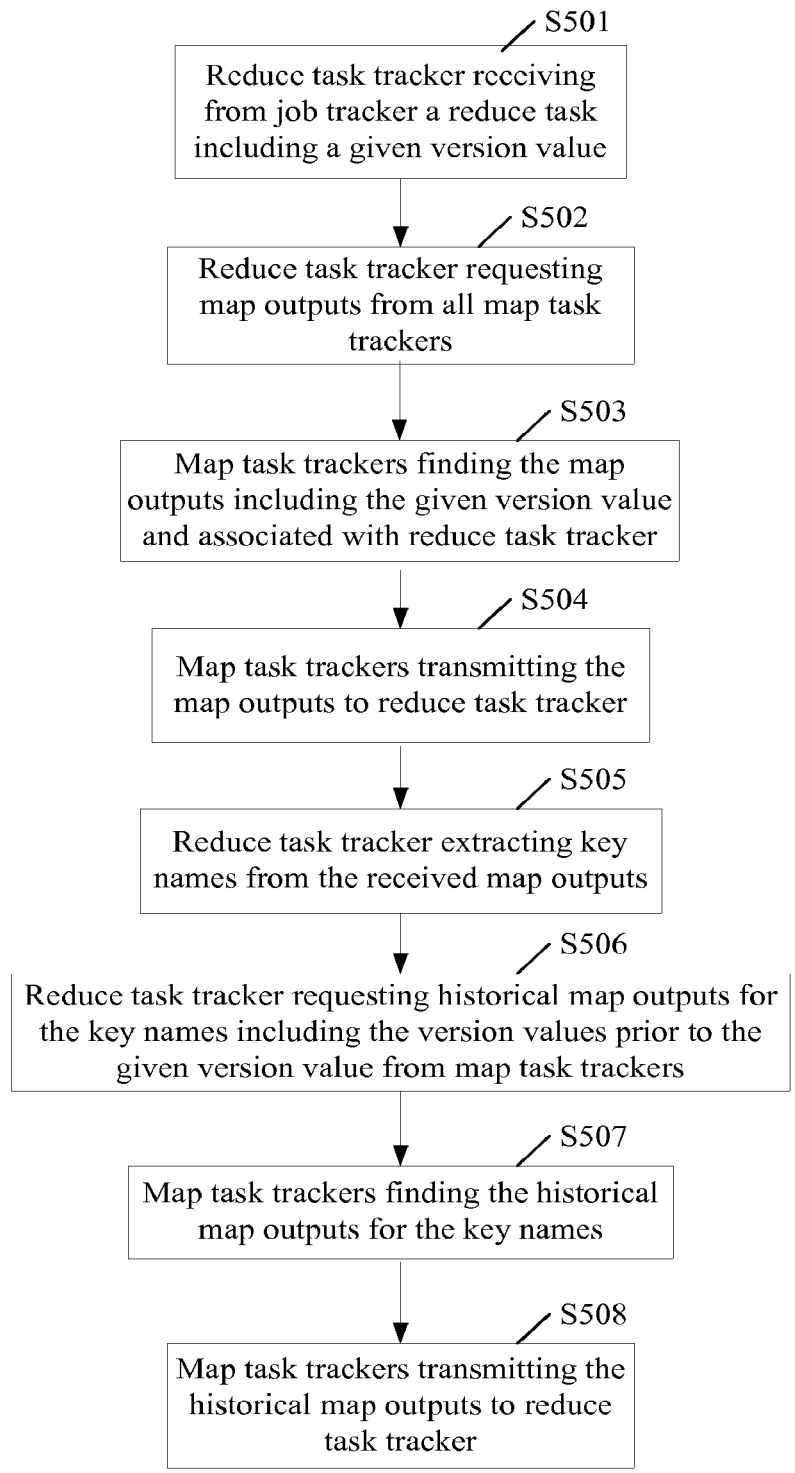
FIG. 5 is a flow chart of an example of the reduce task tracker acquiring map outputs from the map task tracker in response to the reduce task distributed by the job tracker in the embodiment shown in FIG. 2.

FIG. 5 shows a flow chart of an example of the reduce task tracker acquiring map outputs from the map task trackers in response to the reduce task distributed by the job tracker. The example is suitable for the case where the related information includes the job number, the map task number and the version value. As shown in FIG. 5, at step S501, the reduce task tracker receives the reduce task from the job tracker, wherein the reduce task includes the given version value. The given version value can be used to define a range of the map outputs required for the reduce task. Then, at step S502, the reduce task tracker requests the map outputs from all map task trackers, wherein the request includes the given version value. After receiving the above request for the map outputs, at step S503, the map task trackers find the map outputs from the associated local storage regions based on the given version value and an identity of the reduce task tracker. Then, at step S504, the map task trackers transmits the found map outputs to the reduce task tracker. After receiving the transmitted map outputs including the given version value, at step S505, the reduce task tracker extracts the key names from the received map outputs, these key names being the key names to be processed by the reduce tasks to be executed. Then, at step S506, based on the extracted key names, the reduce task tracker requests the historical map outputs for these key names including the version values prior to the given version value from all map task trackers. After receiving the request for the historical map outputs for the key names, at step S507, the map task trackers find the historical map outputs for these key names, and at step S508, the map task trackers transmit the found historical map outputs to the reduce task tracker. The reduce task tracker receives these historical map outputs and alternatively combines the historical map outputs with the previously received map outputs including the given version value based on the key names. In the example shown in FIG. 5, the reduce task tracker acquires the desired map outputs through two pull operations.

Figure 6:
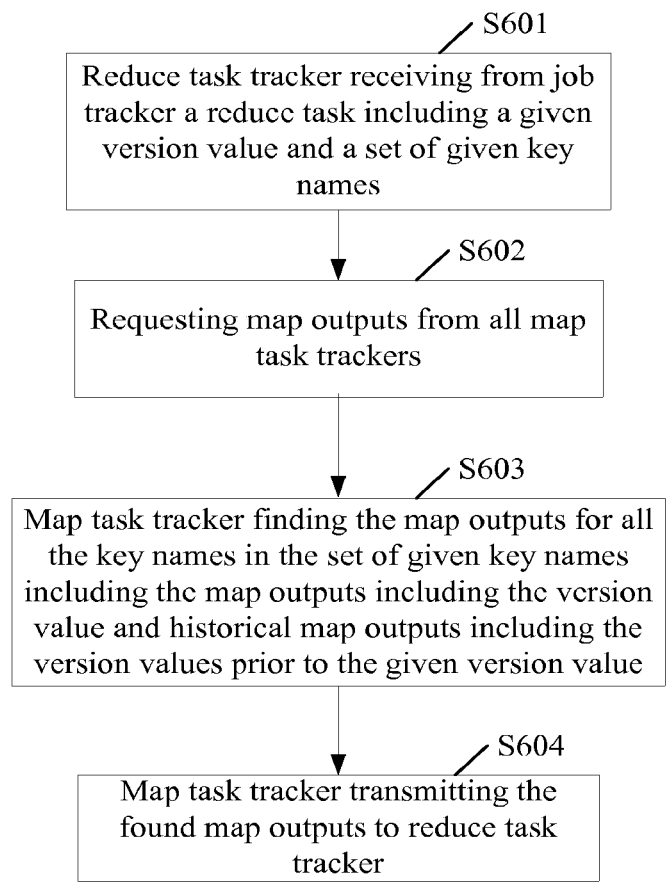
FIG. 6 is a flow chart of another example of the reduce task tracker acquiring map outputs from the map task tracker in response to the reduce task distributed by the job tracker in the embodiment shown in FIG. 2.

FIG. 6 shows a flow chart of another example of the reduce task tracker acquiring map outputs from the map task trackers. The example is suitable for the case where the related information includes the job number, the map task number, the version value and a set of key names. As shown in FIG. 6, at step S601, the reduce task tracker receives the reduce task from the job tracker, wherein the reduce task includes the given version value and a set of given key names. The set of given key names indicates the key names to be processed by the distributed reduce task. Then, at step S602, the reduce task tracker sends a request to all map task trackers for map outputs, wherein the request includes the given version value and the set of given key names After receiving the above request for the map outputs, at step S603, the map task trackers find the map outputs for all the key names in the given key name set, wherein the map outputs for each of the key names include the map outputs for the key name including the given version value and the historical map outputs for the key name including the version values prior to the given version value. At step S604, the map task trackers transmit the found map outputs to the reduce task tracker. The reduce task tracker receives the map outputs from the map task trackers. In the example shown in FIG. 6, when the job tracker specifies the set of key names required for the reduce task, the reduce task tracker may obtain the desired map outputs through only one pull operation.

In this example, if the map task tracker uses the Bloom Filter to process the set of key names when informing the job tracker of the related information, after receiving the request, the map task tracker also uses the Bloom Filter to determine whether it stores the map outputs for the key names in the set of key names.

Returning to FIG. 2, at step S220, the reduce task tracker executes the reduce task on the acquired map outputs. In this step, the reduce task tracker sorts the acquired map outputs, so that the map outputs for the same key name are aggregated together. Thus the sorted map outputs for each of the key names may include the map outputs for the key name including the given version value and the historical map outputs for the key name including the version values prior to the given version value from different map task trackers. Then, the reduce task tracker uses the reduce function to execute the reduce operation on the sorted map outputs, that is, the sorted map outputs are delivered to the reduce function, and the outputs generated by the reduce function are added into the final output file. After the reduce task is completed, the reduce task tracker informs the job tracker of the reduce task completion.

It can be seen from the above description that in the present embodiment the version information (e.g. the version value, etc.) is introduced to identify whether the data addition occurs and the reduce task tracker only acquires the intermediate key-value pairs affected by the data addition from the map task tracker and executes the reduce operation without acquiring other unaffected intermediate key-value pairs, thereby efficiently reducing the number of the key-value pairs to be processed and the required resources when the data addition occurs and further reducing the processing latency.

Figure 7:
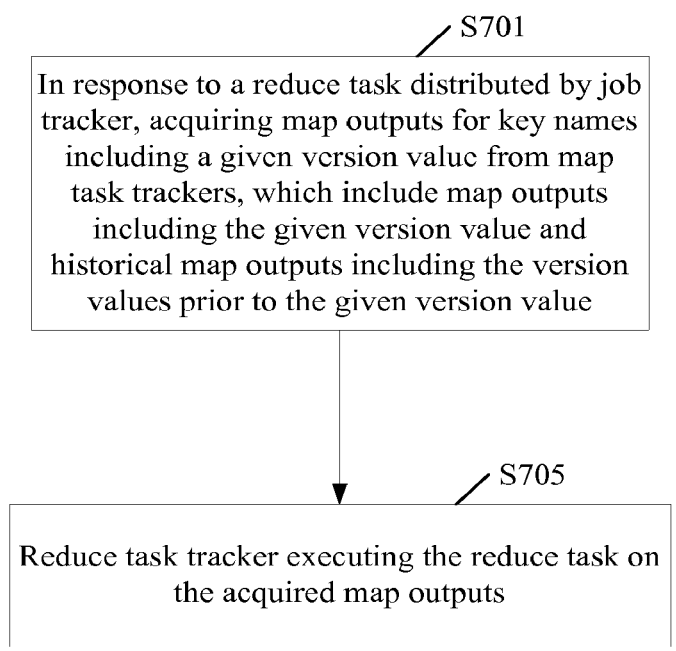
FIG. 7 is a flow chart of a method for reducing data by a reduce task tracker in a data center according to an embodiment of the present invention.

Under the same inventive concept, FIG. 7 shows a flow chart of a method for reducing data by the reduce task tracker in the data center according to an embodiment of the present invention. The method of the present embodiment is a part of the MapReduce method performed by the reduce task tracker in the embodiment shown in FIG. 2, and therefore, the description of the same part thereof is omitted appropriately.

As shown in FIG. 7, at step S701, in response to the reduce task distributed by the job tracker, the reduce task tracker acquires map outputs for the key names including the given version value from the map task tracker, and the acquired map outputs include the map outputs including the given version value and the historical map outputs including the version values prior to the given version value.

If the reduce task received by the reduce task tracker from the job tracker includes the given version value, the reduce task tracker requests the map outputs from all map task trackers, wherein the request includes the above given version value, then receives the map outputs including the given version value and associated with the reduce task tracker from the map task tracker, and extracts the key names from these map outputs. As described above, the extracted key names are the key names to be processed by the reduce tasks to be executed later. The reduce task tracker requests the historical map outputs for the extracted key names including the versions prior to the given version value from all map task trackers, and receives the historical map outputs for these key names from the map task trackers.

If the reduce task received by the reduce task tracker from the job tracker includes the given version value and the set of given key names, the reduce task tracker requests the map outputs from all map task trackers, wherein the request includes the above given version value and the set of given key names. Then the reduce task tracker receives the map outputs for all the key names in the set of given key names from the map task tracker, wherein the map outputs for each of the key names include the map outputs for the key name including the given version value and the historical map outputs for the key name including the version values prior to the given version value.

Then, at step S705, the reduce task tracker executes the reduce task on the acquired map outputs. Specifically, the reduce task tracker sorts the acquired map outputs so that the map outputs for the same key name are aggregated together, and then executes the reduce operation on the sorted map outputs with the reduce function.

Figure 8:
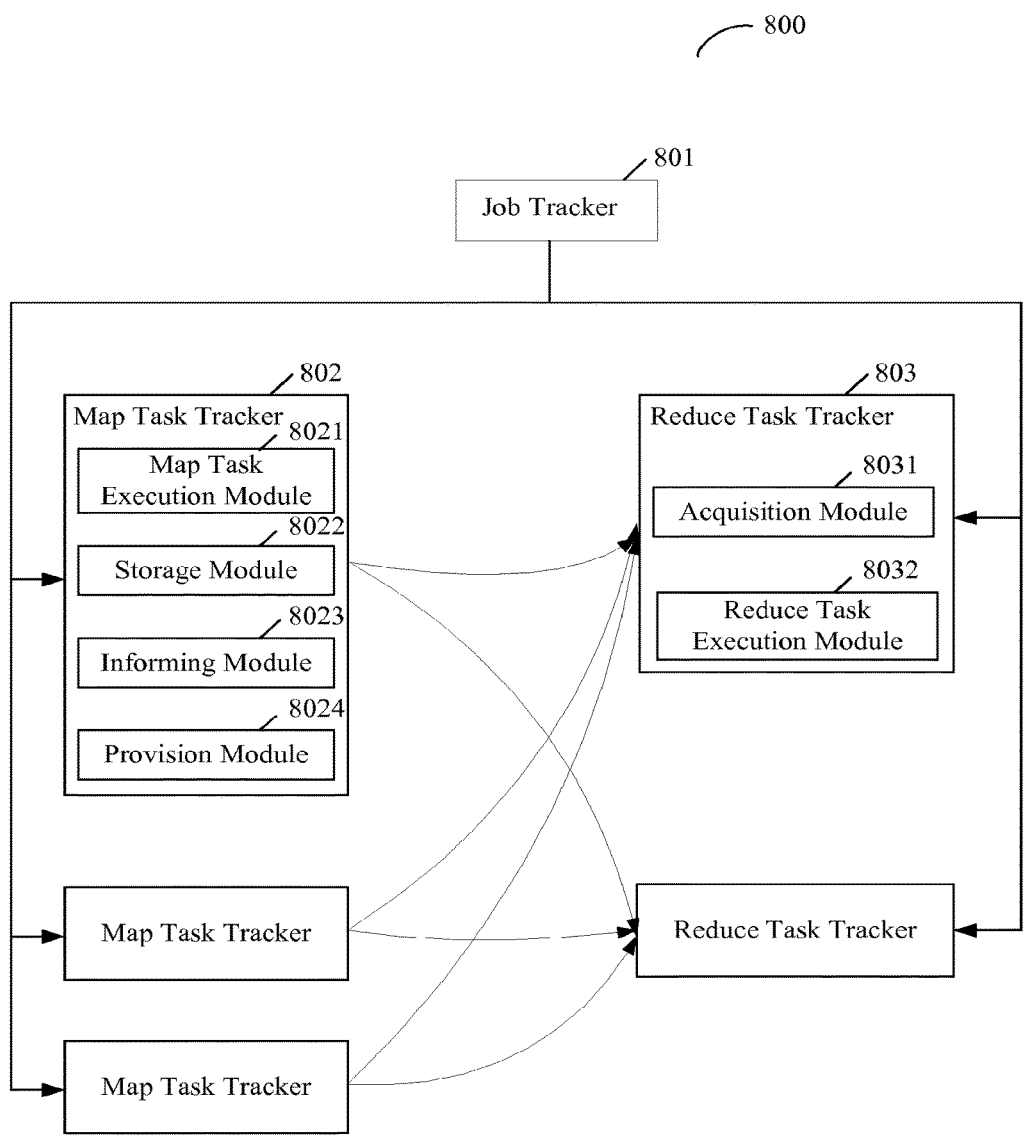
FIG. 8 is a schematic block diagram of a MapReduce system for a data center according to an embodiment of the present invention.

Under the same inventive concept, FIG. 8 shows a schematic block diagram of a MapReduce system 800 for a data center according to an embodiment of the present invention. Referring to the figure, the present embodiment will be described in detail, wherein for the same parts as in the previous embodiments, the description thereof is omitted appropriately.

As shown in FIG. 8, the MapReduce system 800 of the embodiment includes a job tracker 801, multiple map task trackers 802 and multiple reduce task trackers 803. The map task tracker 802 further includes: a map task execution module 8021 which, in response to the map task distributed by the job tracker 801, executes the map task to generate the map output including the version information; a storage module 8022 which stores the map output generated by the map task execution module 8021; an informing module 8023 which informs the job tracker 801 of related information of the map output; and a provision module 8024 which, in response to the request from the reduce task tracker 803, provides the requested map outputs to the reduce task tracker 803. The reduce task tracker 803 further comprises: an acquisition module 8031 which, in response to reduce task distributed by the job tracker 801, acquires the map outputs for key names including the given version information from the map task tracker 802, wherein the acquired map outputs include the map outputs including the given version information and the historical map outputs including the version information prior to the given version information; and a reduce task execution module 8032 which executes the reduce task on the acquired map outputs.

It shall be noted that the MapReduce system 800 of the present embodiment can operatively implement the MapReduce method for a data center as shown in FIG. 2.

Figure 9:
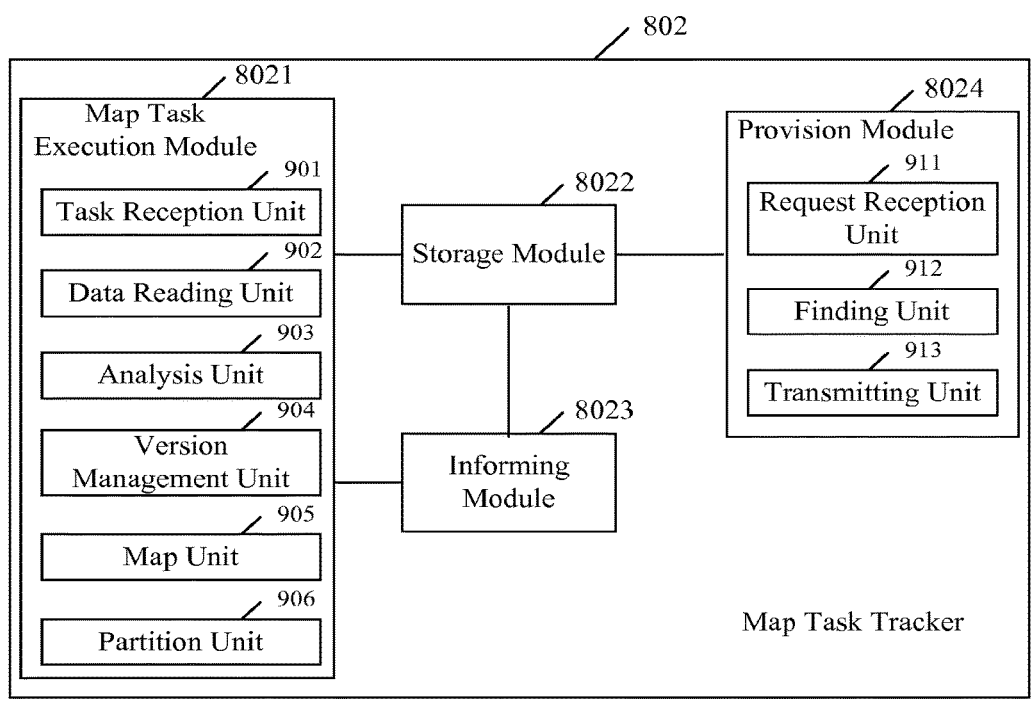
FIG. 9 is a schematic block diagram of a map task tracker according to an embodiment of the present invention.

FIG. 9 further shows a schematic block diagram of the map task tracker 802, wherein the version information includes the version value. As shown in FIG. 9, in the map task execution module 8021, a task reception unit 901 receives the map task from the job tracker 801. The storage positions for the input data splits of the map task are indicated in the map task. Then, a data read unit 902 reads the input data splits from the indicated storage positions, and provides them to an analysis unit 903 for analysis to generate the key-value pairs. A version management unit 904 assigns the version value to each of the key-value pairs generated by the analysis unit 903. Then, the key-value pairs including the version value are transmitted to a mapping unit 905 to execute the map operation with the map function to generate the intermediate key-value pairs. Finally, a partition unit 906 executes the partition operation on the generated intermediate key-value pairs to generate the map output of the map task.

In another embodiment, the version management unit 904 in the map task execution module 8021 assigns the version value to each of the intermediated key-value pairs outputted by the mapping unit 905 after the map operation.

The map outputs outputted by the map task execution module 8021 are stored in the storage module 8022. In the present embodiment, the storage module 8022 is configured to store the map outputs based on the version value and the associated reduce task tracker 803. Of course, those skilled in the art can understand that the storage module 8022 may also store the map outputs in other ways. When the map tasks are completed, the informing module 8023 informs the job tracker 801 of the map task completion and transmits the related information of the map output to it. As described above, the related information may include the job number, the map task number and the version information. Additionally the related information may further include a set of key names.

If the related information includes the job number, the map task number and the version value, when the reduce task tracker 803 requests the map outputs from the map task tracker 802, in the provision module 8024, a request reception unit 911 receives the request including the given version value. Then, based on the given version value and the identity of the reduce task tracker 803 which sends the request, a finding unit 912 finds the corresponding map outputs in the associated local regions of the map task tracker 802, and the found map outputs are transmitted by a transmitting unit 913 to the reduce task tracker 803. Then the request reception unit 911 receives a request for the historical map outputs for the key names including the version values prior to the given version value from the reduce task tracker 803. The finding unit 912 finds the historical map outputs for these key names and the transmitting unit 913 transmits these historical map outputs to the reduce task tracker 803.

In addition, if the related information includes the job number, the map task number, the version value and the set of key names, when the reduce task tracker 803 requests the map outputs from the map task tracker 802, in the provision module 8024, the request reception unit 911 receives the request for the map outputs, wherein the request includes the given version value and the set of given key names. Then the finding unit 912 find the map outputs for all the key names in the set of given key names, wherein the map outputs for each of the key names include the map outputs for the key name including the given version value and the historical map outputs for the key name including the version values prior to the given version value, and the transmitting unit 913 transmits these map outputs to the reduce task tracker 803.

Figure 10:
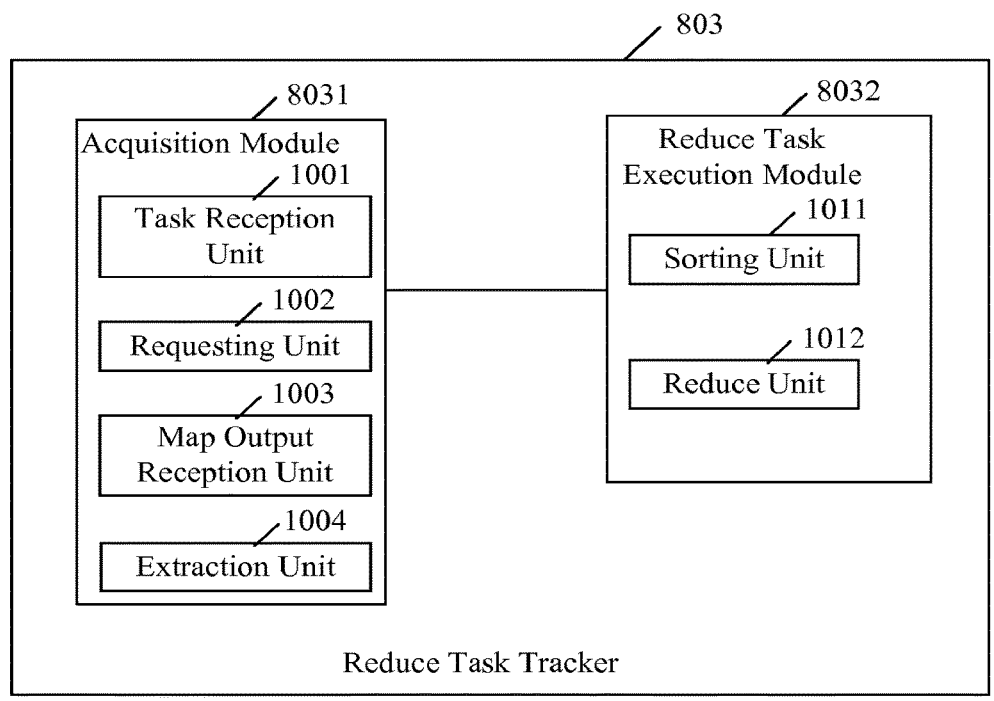
FIG. 10 is a schematic block diagram of a reduce task tracker according to an embodiment of the present invention.

FIG. 10 further shows a schematic block diagram of the reduce task tracker 803. As shown in FIG. 10, in the acquisition module 8031, a task reception unit 1001 receives the reduce task from the job tracker 801. If the received reduce task includes the given version value, a request unit 1002 requests the map outputs from the map task tracker 802, wherein the request includes the given version value. Then a map output reception unit 1003 receives the map outputs including the given version value. An extraction unit 1004 extracts the key names from these map outputs, and the request unit 1002 requests the historical map outputs for the extracted key names including the version values prior to the given version value from all map task trackers 802. The map output reception unit 1003 receives the historical map outputs for these key names from the map task trackers 802. If the received reduce task includes the given version value and the set of given key names, the request unit 1002 requests the map outputs from the map task tracker 802, wherein the request includes the given version value and the set of given key names. Then the map output reception unit 1003 receives the map outputs for all the key names in the set of given key names from the map task tracker 802, wherein the map outputs for each of the key names include the map outputs for the key name including the given version name and the historical map outputs for the key name including the version values prior to the given version value.

Then, in the reduce task execution module 8032, a sorting unit 1011 sorts the map outputs acquired by the acquisition module 8031 so that the map outputs for the same key name are aggregated together, and then a reduce unit 1012 executes the reduce operation on these sorted map outputs with the reduce function.

It shall be noted that the reduce task tracker 803 of the present embodiment can operatively implement the method for reducing data by a reduce task tracker in a data center as shown in FIG. 7.

The MapReduce method for a data center and the method for reducing data by a reduce task tracker in a data center disclosed in the above embodiments may be implemented in software, hardware, or combination of software and hardware. The hardware portion may be implemented by application specific logic. For example, the MapReduce system and its components as well as the reduce task tracker and its components may be implemented by hardware circuits such as Large Scale Integrated circuits or gate arrays, semiconductors such as logic chips or transistors or programmable hardware devices such as field programmable gate array, programmable logic devices etc., or can be implemented by software which can be executed by various processors, or can be implemented by the combination of the above hardware circuit and software. The software portion can be stored in memory and executed by an appropriate instruction execution system such as microprocessor, personal computer (PC) or mainframe.

Although the MapReduce method and system for a data center and the method for reducing data by a reduce task tracker in a data center as well as the reduce task tracker of the present invention have been described in detail through some exemplary embodiments, these embodiments are not exhaustive, and those skilled in the art can realize various changes and modifications within the spirit and scope of the present invention. Therefore, the present invention is not limited to these embodiments, and the scope of which is only defined by appended claims.

What is claimed is:

1. A computer program product for an operating data center, wherein the data center includes a job tracker, map task trackers, and reduce task trackers comprising a non-transitory storage medium readable by a processing circuit and storing instructions for execution by the processing circuit for performing a method comprising:
   in response to a map task distributed by the job tracker:
      executing, via a hardware-implemented map task tracker, the map task to generate a first map output having first version information, wherein the hardware-implemented map task tracker comprises a first special-purpose integrated circuit, wherein the first version information includes a version value identifying when the map task was added and is assigned by the map task tracker, and wherein the executing further comprises:
         receiving from the job tracker the map task, the map task specifying storage positions for input data splits of the map task;
         reading the input data splits from the storage positions included in the map tasks;
         analyzing the input data splits to generate key-value pairs;
         assigning a version value to each of the key-value pairs;
         executing, with a map function, a map operation on the key-value pairs having the version value to generate intermediate key-value pairs having the version value;
         executing a partition operation on the intermediate key-value pairs to generate the first map output;
         storing, via the map task tracker, the generated first map output;
         informing, via the map task tracker, the job tracker of the map task completion; and
         transmitting, via the map task tracker, to the job tracker, related information of the first map output, in order for the job tracker to provide the map output to the reduce tracker, wherein the related information comprises a job number, a map task number, and the first version information;
   in response to a reduce task distributed to hardware-implemented reduce task tracker by the job tracker including the related information:
      acquiring, via the reduce task tracker, one or more map outputs for key names having specified version information from the map task tracker, wherein the hardware-implemented reduce task tracker comprises a second special-purpose integrated circuit, wherein the acquired one or more map outputs comprise one or more current map outputs having the first version information and one or more historical map outputs having historical version information, wherein the historical version information indicates origination of the key names from a historical map task added prior to the map task, wherein the specified version information defines a range of the map outputs required for the reduce task including the first version information; and
      executing, via the reduce task tracker, the reduce task on the acquired one or more map outputs.

2. The computer program product according to claim 1, wherein the acquiring, via the reduce task tracker, the one or more map outputs for key names having the specified version information comprises:
   receiving, via the reduce task tracker, from the job tracker the reduce task, the reduce task specifying a given version value;
   requesting the one or more current map outputs having the given version value assigned by the map task trackers;
   in response to receiving the request for the one or more current map outputs:
      finding, by the map task trackers, the one or more current map outputs that have the given version value and are associated with the reduce task tracker; and
      transmitting the found one or more current map outputs to the reduce task tracker;
   receiving, via the reduce task tracker, the transmitted one or more current map outputs;
   extracting the key names from the received one or more current map outputs; and
   requesting one or more historical map outputs for the extracted key names that include historical version values prior to the given version value;
   in response to receiving the request for the one or more historical map outputs for the extracted key names having historical version values prior to the given version value:
      finding, via the map task trackers, the one or more historical map outputs for the key names; and
      transmitting the one or more historical map outputs to the reduce task tracker; and
   receiving, at the reduce task tracker, the one or more historical map outputs.

3. The computer program product according to claim 1, wherein the related information further comprises a set of key names.

4. The computer program product according to claim 1, wherein the acquiring, via the reduce task tracker, the one or more map outputs for key names having the specified version information comprises:
   receiving, via the reduce task tracker, from the job tracker the reduce task, wherein the reduce task specifies a given version value and a set of given key names requesting the one or more map outputs from the map task trackers, wherein the request comprises the given version value and the set of given key names;
   in response to receiving the request for the one or more map outputs:
      finding, via the map task trackers, the one or more map outputs for the key names in the set of given key names, wherein the found one or more map outputs for each of the key names comprise the one or more current map outputs for the key name having the given version value and the one or more historical map outputs for the key name having historical version values prior to the given version value; and
      transmitting the found one or more map outputs to the reduce task tracker; and
   receiving, via the reduce task tracker, the transmitted one or more map outputs from the map task trackers.

5. The computer program product according to claim 1, wherein executing, by the reduce task tracker, the reduce tasks on the acquired one or more map outputs comprises:
   sorting the acquired one or more map outputs so that map outputs for the same key name are aggregated together; and
   executing, with a reduce function, a reduce operation on the sorted one or more map outputs.

6. A method for reducing data by a hardware-implemented reduce task tracker in a data center, the method comprising:

in response to a reduce task distributed by a job tracker:
acquiring one or more map outputs for key names having given version information assigned by map task trackers;
wherein the hardware-implemented reduce task tracker comprises a special-purpose integrated circuit;
wherein the acquired one or more map outputs comprise one or more current map outputs with the given version information and one or more historical map outputs with historical version information indicating a time prior to the version information;
wherein the given version information was assigned by a map task tracker and indicates when a map task from which the one or more current map outputs originated was added;
wherein acquiring the one or more map outputs for key names comprises:
receiving from the job tracker the reduce task, the reduce task specifying a given version value;
requesting from the map task tracker the one or more current map outputs having the given version value;
receiving from the map task trackers the one or more current map outputs that have the given version value and are associated with the m reduce task tracker;
extracting key names from the received one or more current map outputs;
requesting from the map task trackers the one or more historical map outputs for the extracted key names having historical version values prior to the given version value; and
receiving from the map task trackers the one or more historical map outputs for the key names having the historical version values prior to the given version value; and
executing the reduce task on the acquired one or more map outputs.

7. The method according to claim 6, wherein acquiring the one or more map outputs for key names comprises:
receiving from the job tracker the reduce task, the reduce task specifying a given version value and a set of given key names;
requesting from the map task trackers the one or more map outputs, wherein the request comprises the given version value and the set of given key names; and
receiving from the map task trackers the one or more map outputs for the key names in the set of given key names, wherein the one or more map outputs for each of the key names include the one or more current map outputs for the key name with the given version value and the one or more historical map outputs for the key name with historical version values prior to the given version value.

8. The method according to claim 6, wherein executing the reduce task on the acquired one or more map outputs comprises:
sorting the acquired one or more map outputs so that map outputs for the same key name are aggregated together; and
executing, with a reduce function, a reduce operation on the sorted one or more map outputs.

9. A hardware-implemented reduce task tracker for reducing data in a data center, comprising:

an acquisition module corresponding to a special-purpose integrated circuit that, in response to a reduce task distributed by a job tracker:
acquires, by a computer processor, one or more map outputs for key names having given version information assigned by map task trackers;
wherein the acquired one or more map outputs comprise one or more current map outputs with the given version information and one or more historical map outputs with historical version information indicating a time prior to the given version information;
wherein the given version information was assigned by a map task tracker and indicates when a map task from which the one or more current map outputs originated was added;
wherein the acquisition module comprises:
a task reception unit that receives from the job tracker the reduce tack, the reduce task specifying a given version value;
a requesting unit that requests from the map task trackers the one or more current map outputs that have the given version value, and requests from the map task trackers the one or more historic map outputs for key names having historical version values prior to the given version value;
a map output reception unit that receives from the map task trackers the one or more current map outputs that have the given version value and are associated with the reduce task tracker, and receive, from the map task trackers the one or more historical map outputs for the key names having the historical version values prior to the given version value; and
an extraction unit that extracts the key names from the one or more current map outputs that have the given version value and are associated with the reduce task tracker; and
a reduce task execution module that executes the reduce task on the acquired one or more map outputs.

10. The reduce task tracker according to claim 9, wherein the acquisition module comprises:
a task reception unit that receives from the job tracker the reduce task, the reduce task specifying a given version value and a set of given key names;
a requesting unit that requests from the map task trackers the one or more map outputs, wherein the request comprises the given version value and the set of given key names; and
a map output reception unit that receives from the map task trackers the one or more map outputs for the key names in the set of given key names, wherein the received one or more map outputs for each of the key names include the one or more current map outputs for the key name having the given version value and the one or more historical map outputs for the key name having the historical version values prior to the given version value.

11. The reduce task tracker according to claim 9, wherein the reduce task execution module comprises:
a sorting unit that sorts the received one or more map outputs so that map outputs for the same key name are aggregated together; and
a reduce unit that executes, with a reduce function, a reduce operation on the sorted one or more map outputs.

* * * * *